June 17, 1930.  E. J. R. BEATTEY  1,764,495
OPHTHALMIC MOUNTING
Filed Feb. 27, 1928
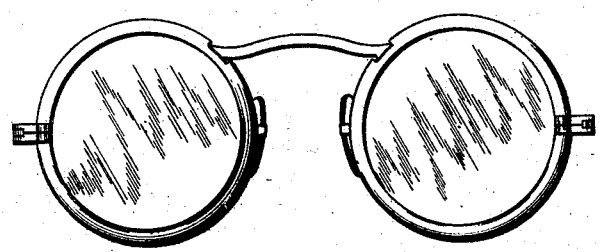
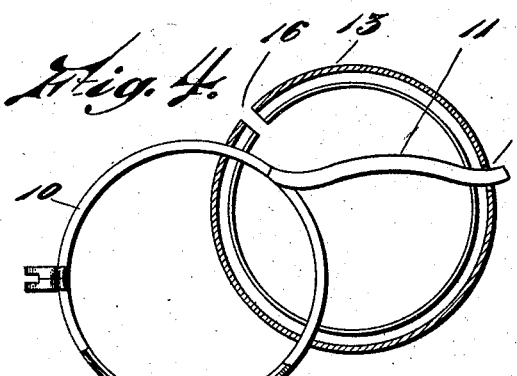
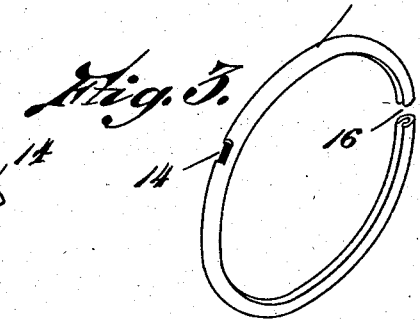
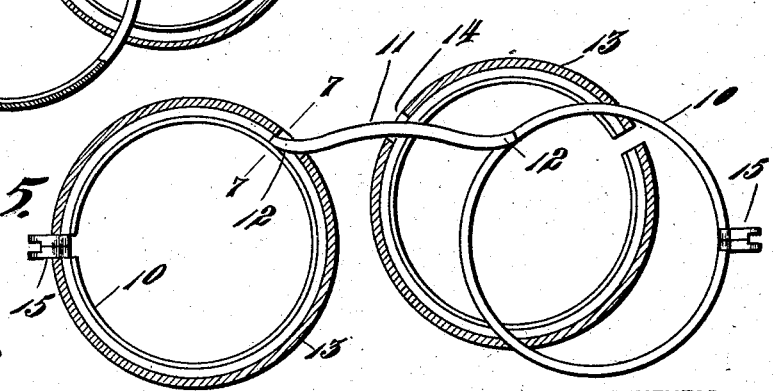
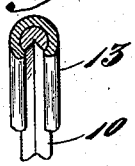
INVENTOR.
Earle J. R. Beattey.
BY Barlow & Barlow
ATTORNEYS.

Patented June 17, 1930

1,764,495

UNITED STATES PATENT OFFICE

EARLE J. R. BEATTEY, OF EDGEWOOD, RHODE ISLAND, ASSIGNOR TO UNIVERSAL OPTICAL CORPORATION, OF PROVIDENCE, RHODE ISLAND, A CORPORATION OF RHODE ISLAND

OPHTHALMIC MOUNTING

Application filed February 27, 1928. Serial No. 257,216.

This invention relates to an improved construction of ophthalmic mounting; and has for its object to provide in such a mounting a pair of spaced metal eyewires secured in position by a bridge-bar, each of the eyewires being covered by a non-metallic rim having a peripheral opening or piercing of a size to receive and be threaded on to an unattached end of the bridge-bar prior to the soldering of this end of the bridge-bar to its eyewire, the first rim after having been threaded onto the bar being at once positioned on its wire and the second rim threaded onto the bar being attached to its eyewire after the free end of the bridge has been soldered to its eyewire.

With these and other objects in view, the invention consists of certain novel features of construction, as will be more fully described, and particularly pointed out in the appended claims.

In the accompanying drawings:

Fig. 1 is a front view of my improved ophthalmic mounting having its non-metallic rims pierced and threaded onto the bridge-bar.

Fig. 2 is an edge view of the same.

Fig. 3 is a perspective view showing one of the non-metallic rims pierced to receive the bridge-bar.

Fig. 4 shows one of the non-metallic rims as being threaded on to the bridge bar.

Fig. 5 shows the second non-metallic rim as having been threaded onto the bridge-bar, and the bridge-bar as having been soldered in position to its eyewire and the non-metallic rim ready to be positioned on its eyewire.

Fig. 6 is a section thru the eyewire showing the non-metallic rim embracing the same.

Fig. 7 is a section on line 7—7 of Fig. 5, at the point where the end of the bridge-bar extends thru the opening in the non-metallic rim.

It is found in the practical construction of ophthalmic mountings of this character which have a pair of metallic eyewires connected together by a bridge-bar and the eyewires covered by a non-metallic rim, of advantage to pierce the non-metallic rim to be threaded onto the bridge-bar after one end of the bar has been connected to one of its eyewires and prior to the soldering of the second end of the bridge-bar to its eyewire, whereby one of the non-metallic rims may be threaded over the unattached end of the bridge-bar and slid along the bar and snapped about its eyewire and the second non-metallic rim may be threaded onto the bridge-bar and swung off to one side permitting the free end of the bridge-bar to be soldered to its eyewire, and this non-metallic rim being subsequently slid along the bridge-bar to be snapped into position over its eyewire. In some instances, the outer edge of the non-metallic rims may be split to receive the ends of the eyewires, the construction herein shown illustrates the ends of the bridge-bar as being attached to the eyewires a substantial distance above the medial line thru the eyewires; and the following is a detailed description of the present embodiment of my invention and showing one arrangement of parts whereby these advantageous results may be accomplished:

With reference to the drawings, 10 designates a pair of metal eyewires which are connected together in spaced relation by means of a bridge-bar 11, the ends 12 of the bridge-bar being preferably turned upwardly to extend along the surface of the eyewires and be soldered thereto at a point a substantial distance above the medial line thru the eyewires.

In applying a non-metallic rim 13 to these eyewires, I pierce the periphery or form an opening at 14 thru the periphery of each of the rims and in assembling the parts, I first solder one end of the bridge-bar to its eyewire 10, then I thread the free end of the bridge bar 11 thru the opening 14 in the non-metallic rim which is to engage the eyewire to which the other end of the bridge-bar is attached. This rim is then slid along the bridge-bar and snapped over the eyewire into operative position. I next thread the other non-metallic rim onto the bridge bar into somewhat the position illustrated in Fig. 5, I then swing this rim outwardly leaving a space for the free end of the bar to now be soldered in its position to the periphery of its eyewire. I then slide the rim along the bridge and snap it into its permanent position over its eyewire.

In some instances, I provide end pieces 15 on the metal eyewires and in this case I slot the non-metallic rim as at 16 to receive these end pieces.

By my improved construction, I am enabled to very readily position the non-metallic rims over the metallic eyewires and provide the minimum amount of an opening for the reception of the bridge-bar which extends therethrough to be attached to the metallic eyewires within the rims.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A method of applying non-metallic rims to the metallic eyewires of an ophthalmic mounting, which consists in attaching one end of the bridge-bar to one of the eyewires, piercing the non-metallic rims with a hole of a size to receive the bridge member, threading the first non-metallic rim onto the bridge-bar and snapping it into position over its eyewire, threading the second non-metallic rim onto the free end of the bridge-bar then soldering the free end of the bridge-bar to its eyewire, and subsequently sliding the second rim along the bridge-bar and snapping it in position over its eyewire.

2. An ophthalmic mounting having a pair of spaced metal eyewires, a bridge-bar soldered at its ends to said eyewires to secure them together, and a U-shaped non-metallic rim for each eyewire having an opening intermediate its edges, the bridge-bar extending through the openings in said rims and covering the soldered joint at each of the ends of said bridge-bar.

3. An ophthalmic mounting having a pair of spaced metal eyewires having end pieces, a bridge-bar soldered at its ends to said eyewires to secure them together, and a U-shaped non-metallic rim for each eyewire having an opening intermediate its edges, the bridge-bar extending through the openings in said rims and covering the soldered joint at each of the ends of said bridge-bar, the ends of each non-metallic rim being formed to receive its respective end piece.

In testimony whereof I affix my signature.

EARLE J. R. BEATTEY.